(12) United States Patent
Kelemen

(10) Patent No.: US 6,248,472 B1
(45) Date of Patent: Jun. 19, 2001

(54) ELECTROCHEMICAL CELL FORMED WITH CAN HAVING WALLS EXTENDING RADIALLY INWARD

(75) Inventor: Marc P. Kelemen, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/209,713

(22) Filed: Dec. 11, 1998

(51) Int. Cl.[7] .................................................. H01M 2/00
(52) U.S. Cl. ............................................ 429/163; 429/176
(58) Field of Search .................... 429/163, 176, 429/165, 168

(56) References Cited

U.S. PATENT DOCUMENTS

| | | |
|---|---|---|
| 466,798 | 1/1892 | Nowotny . |
| 757,164 | 4/1904 | Whitman . |
| 1,508,428 | 9/1924 | Wagner . |
| 2,151,654 | 3/1939 | Fitzgerald ............................ 136/166 |
| 2,227,463 | 1/1941 | Neale ..................................... 136/13 |
| 2,424,149 | 7/1947 | Chaplin ................................ 136/107 |
| 2,542,094 | 2/1951 | Richardson et al. ................. 136/107 |
| 2,542,710 | 2/1951 | Ruben ................................... 136/107 |
| 3,210,217 | 10/1965 | Tamminen ........................... 136/132 |
| 3,928,077 | 12/1975 | Sperandio et al. ................... 136/111 |
| 4,283,843 | 8/1981 | Hooke ................................. 29/623.1 |
| 4,960,655 | 10/1990 | Hope et al. ........................... 429/192 |
| 5,422,201 | 6/1995 | Georgopoulos ...................... 429/170 |
| 5,472,806 | 12/1995 | Meintjes ............................... 429/165 |
| 5,603,737 | 2/1997 | Marincic et al. ..................... 29/23.1 |
| 5,654,110 | 8/1997 | Tuttle et al. .......................... 429/66 |
| 5,827,621 | * 10/1998 | Morishita et al. ................... 429/176 |
| 5,916,707 | * 6/1999 | Omaru et al. ........................ 429/163 |

FOREIGN PATENT DOCUMENTS

| | | |
|---|---|---|
| 0751578 | 1/1997 | (EP) . |
| 0795915 | 9/1997 | (EP) . |
| 0928035 | 7/1999 | (EP) . |
| 09293488 | 11/1997 | (JP) . |
| 10199493 | 7/1998 | (JP) . |
| 10-199493 | * 7/1998 | (JP) . |
| 10255727 | 9/1998 | (JP) .............................. H01M/2/02 |

* cited by examiner

Primary Examiner—Stephen Kalafut
Assistant Examiner—Julian A. Mercado
(74) Attorney, Agent, or Firm—Russell H. Toye, Jr.; Robert W. Welsh

(57) ABSTRACT

An electrochemical cell is provided having a non-cylindrical container including one or more side walls each having a curved surface that curves radially inward. The electrochemical cell further includes first and second electrodes and a separator disposed therebetween. A cover and seal assembly is assembled to the top open end of the container. The radially inwardly curved surface of the side walls opposes forces caused by internal pressure within the cell so as to reduce and/or prevent bulging of the side walls.

6 Claims, 3 Drawing Sheets

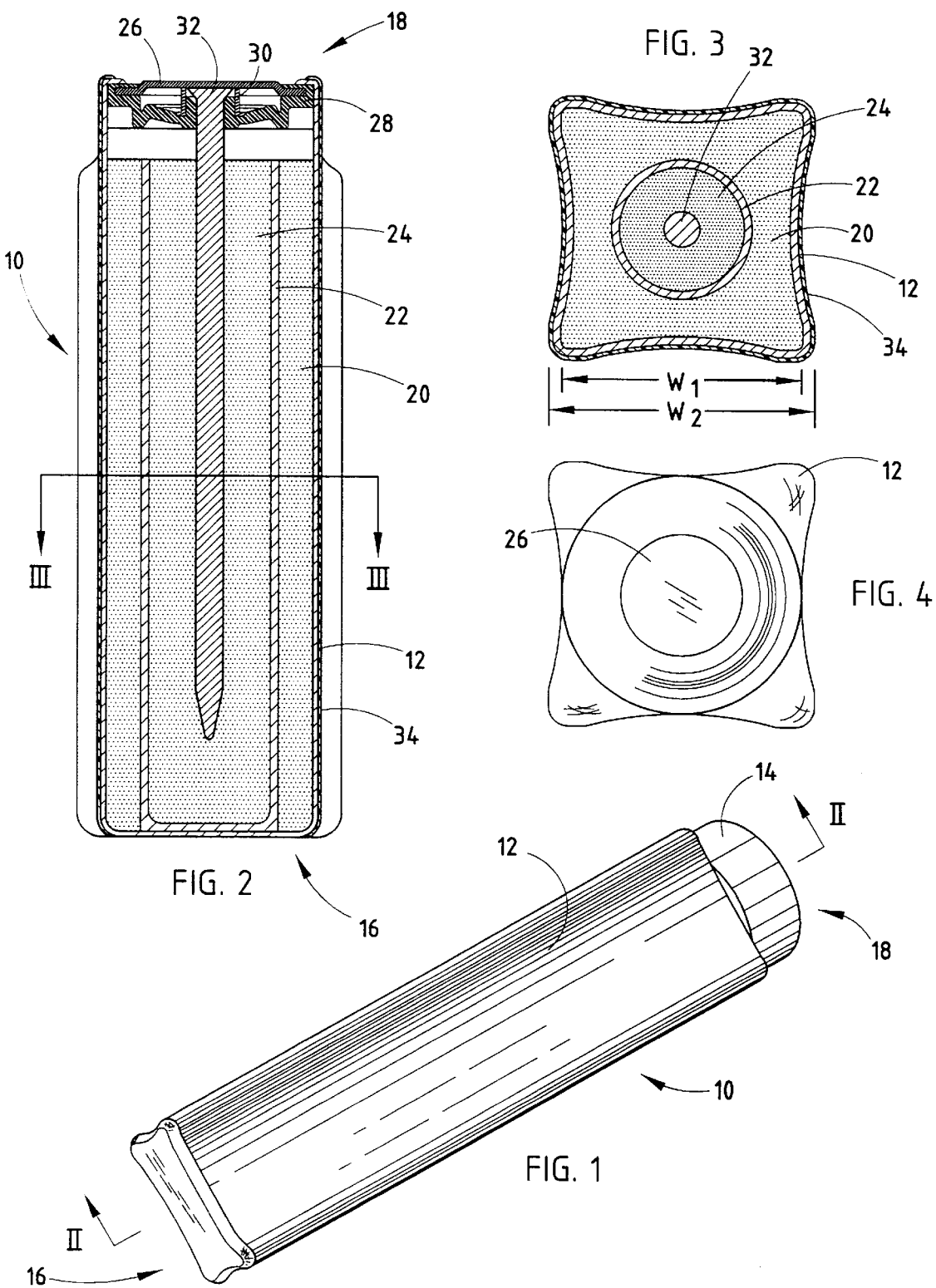

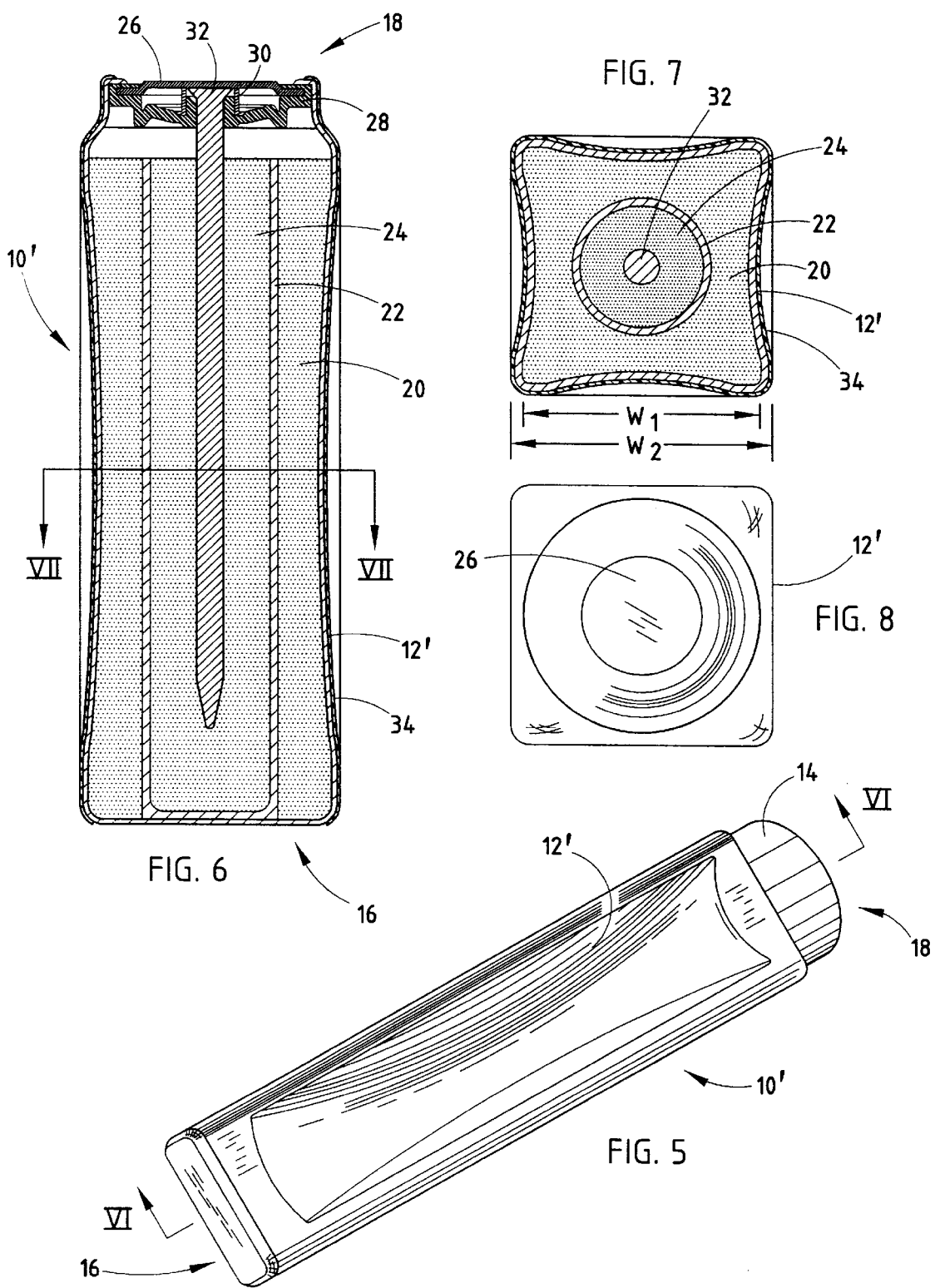

US 6,248,472 B1

ELECTROCHEMICAL CELL FORMED WITH CAN HAVING WALLS EXTENDING RADIALLY INWARD

BACKGROUND OF THE INVENTION

The present invention generally relates to electrochemical cells and, more particularly, to a non-cylindrical electrochemical cell configured to prevent excessive deformation of the cell container.

Electrochemical cells are commonly employed to supply voltage for electrically operated devices, and are particularly well-suited for use with portable electrically operated devices. Currently, the popular conventional alkaline cells are of a generally cylindrical shape which are commercially available in industry standard sizes including D-, C-, AA-, AAA-, and AAAA-size cells, as well as other sizes and configurations. Electrochemical cells, such as the aforementioned cylindrical type, commonly provide for a predetermined open circuit voltage supply.

Conventional cylindrical alkaline cells generally employ a cylindrically-shaped steel can provided with a positive cover at one end and a negative cover at the opposite end. The cylindrical cell has a positive electrode, commonly referred to as the cathode, which is often formed of a mixture of manganese dioxide, potassium hydroxide solution, water, and other additives, formed about the interior side surface of the cylindrical steel can. A cup-shaped separator is generally centrally disposed in an inner cylindrical volume of the can about the interior surface of the cathode. A negative electrode, commonly referred to as the anode, is typically formed of zinc powder, a gelling agent, and other additives, and is disposed along with the electrolyte solution within the separator.

While cylindrical cells of the aforementioned cylindrical kind have become quite popular, it has been discovered that there is potential need to provide for non-cylindrical cell configurations. One such need exists for use in a multiple-cell battery, such as 9-volt battery, which commonly houses six 1.5-volt cells electrically connected in series. In the past, multiple cylindrical cells have been assembled together in a rectangular container, thereby resulting in unused space between adjacent cells as well as between each cell and the inside walls of the rectangular battery container. In addition, it has been discovered that many battery operated devices are capable of using non-cylindrical cells, which may offer increased service performance. Examples of non-cylindrical cells are disclosed in co-pending U.S. application Ser. No. 09/110,119, entitled "ELECTROCHEMICAL CELL AND BATTERY" filed on Jul. 2, 1998, and U.S. application Ser. No. 09/109,754, now U.S. Pat. No. 6,081,992, issued on Jul. 4, 2000, entitled "ELECTROCHEMICAL CELL FORMED WITH BIG MOUTH OPEN END CAN" filed on Jul. 2, 1998, both of which are hereby incorporated by reference.

The cells disclosed in the aforementioned co-pending applications are prismatic with a substantially rectangularly configured steel can containing the active cell materials. The rectangular steel can includes four substantially planar side walls. As an electrochemical cell discharges, pressure can buildup inside the cell. Excessive pressure buildup can potentially lead to bulging of the side walls of the can which in turn may cause some difficulties in removing the battery from a device. Excessive bulging may also force the inner walls of the can away from and out of contact with the cathode, and may thereby reduce performance of the cell. Accordingly, it is a goal in designing alkaline cells to increase the service performance of the cell, while at the same time preventing excessive bulging of the cell.

SUMMARY OF THE INVENTION

The present invention reduces can deformation, such as bulging, of a non-cylindrical electrochemical cell, by providing the can with inwardly curved side walls to oppose radially outward forces such as those caused by internal pressure buildup within the cell. To achieve this and other advantages, and in accordance with the purpose of the invention as embodied and described herein, the present invention provides for an electrochemical cell having a non-cylindrical container having a top end, a bottom end, and one or more side walls, in which at least one of the side walls has a concave radially inward curved surface. The electrochemical cell further includes first and second electrodes and a separator disposed therebetween. A cover and seal assembly is assembled to the top end of the container. The inwardly curved surface of the side walls provides enhanced opposition to forces caused by internal pressure within the cell so as to reduce and/or prevent bulging of the cell walls.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 1 is a perspective view of an electrochemical cell having a prismatic steel can with inwardly curved side walls according to one embodiment of the present invention;

FIG. 2 is a longitudinal cross-sectional view of the electrochemical cell taken through lines II—II of FIG. 1;

FIG. 3 is a radial cross-sectional view of the electrochemical cell taken through lines III—III of FIG. 2;

FIG. 4 is a top end view of the electrochemical cell of FIG. 1;

FIG. 5 is a perspective view of an electrochemical cell having a prismatic steel can with inwardly curved side walls according to a second embodiment of the present invention;

FIG. 6 is a longitudinal cross-sectional view of the electrochemical cell taken through lines VI—VI of FIG. 5;

FIG. 7 is a radial cross-sectional view of the electrochemical cell taken through lines VII—VII of FIG. 6;

FIG. 8 is a top end view of the electrochemical cell of FIG. 5;

DETAILED DESCRIPTION OF THE PREFERRED EMBODIMENTS

Figure 9:
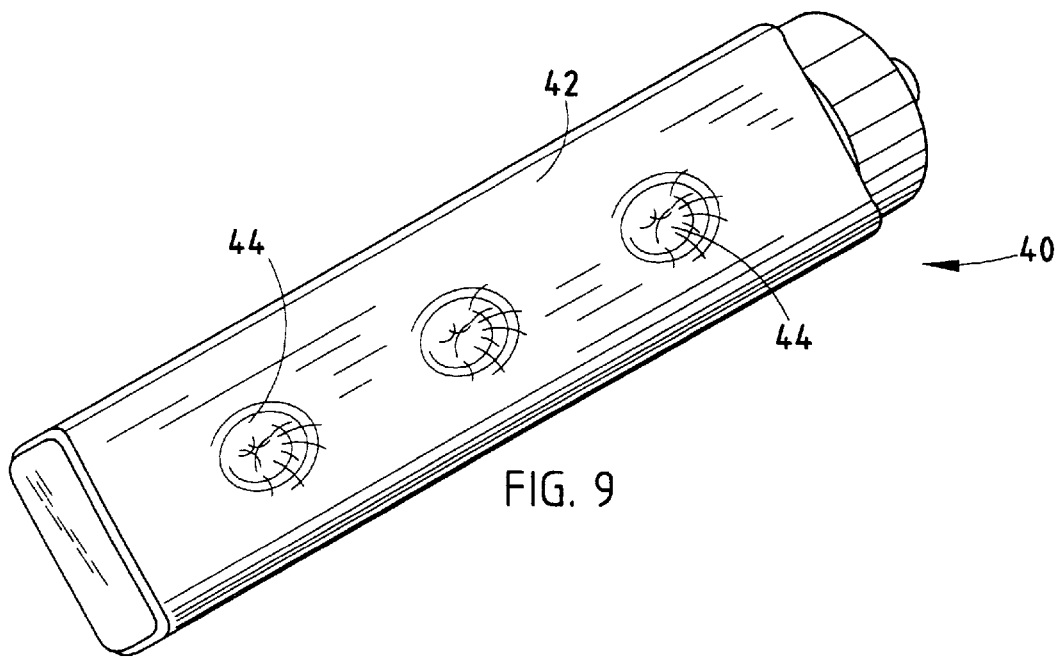
FIG. 9 is a perspective view of an electrochemical cell having a prismatic steel can with curved indentations extending radially inward according to a third embodiment.

Referring now to FIG. 1, an electrochemical cell 10 having a non-cylindrical configuration is shown according to one embodiment of the present invention. The electrochemical cell 10 has a non-cylindrical steel can 12 including one or more side walls, at least one of which has a non-planar inwardly curved surface that curves radially inward toward the can's central longitudinal axis. The inwardly curved side walls provide radially inward extending surfaces that offer enhanced opposition to radially outward directed forces caused by internal pressure within the electrochemical cell 10, so as to reduce and/or prevent bulging of the cell walls. While an electrochemical cell 10 is shown and described herein as a prismatic rectangular cell, it should be appreciated that the teachings of the present invention are likewise applicable to other types of electrochemical cells having various non-cylindrical cell configurations.

The electrochemical cell 10 includes a non-cylindrical container, such as steel can 12, with a closed bottom end 16 and an open top end 18 which is sealingly engaged with a cover and seal assembly 14. The steel can 12, as shown and described herein, has a rectangular configuration with four side walls extending between the top and bottom ends, and each side wall has an inwardly curved surface. According to the first embodiment, the side walls each have an inwardly curved surface extending throughout the entire length of the wall.

Referring particularly to FIG. 2, the electrochemical cell 10 is further shown having a positive electrode, referred to herein as the cathode 20, and a negative electrode, referred to herein as the anode 24. The cathode 20 is preferably formed against the inner walls of the steel can 12 and conforms to the shape of the inside of can 12. Cathode 20 may be formed of a mixture of manganese dioxide, graphite, potassium hydroxide solution, water, and other additives. The anode 24 is disposed within an inner cylindrical cavity in the cathode 20. The anode 24 may include a gel type anode formed of zinc powder, gelling agent, and other additives, and may be mixed with an electrolyte solution formed of potassium hydroxide, zinc oxide, and water. A cup-shaped separator 22 is disposed between the anode 24 and cathode 20. The separator 22 serves as an interface that prevents the migration of solid particles between the cathode 20 and anode 24. Also, disposed within the anode 24 is a current collector 32, which contacts the zinc particles in the anode 24.

Electrochemical cell 10 further has a thin layer of shrink tube insulation 34 formed about the exterior surface of steel can 12, except for the top and bottom ends thereof. The closed bottom end 16 of can 12 may further include a positive cover (not shown) formed of plated steel with a protruding nub at its center region which may form the positive contact terminal of the cell 10. Assembled to the open end 18 of steel can 12 is the cover and seal assembly 14 which forms the negative contact terminal of cell 10.

The cover and seal assembly 14 provides the closure to the assembly of electrochemical cell 10 and includes a seal body 28 and a compression member 30. The seal body 28 is generally shaped like a disk and made from electrically non-conductive material. The compression member 30 is a tubular shaped metallic component that compresses the seal body 28 around the current collector 22. The cover and seal assembly 14 also includes an outer negative cover 26 welded to the exposed end of the current collector 32. The rim of steel can 12 is crimped inwardly toward the cell body to form a seal. The cover and seal assembly 16 with cover 26 may include a conventional round assembly, such as that disclosed in U.S. Pat. No. 5,422,201, which is hereby incorporated by reference.

With particular reference to FIG. 3, a radial cross-sectional view of electrochemical cell 10 is shown taken midway between the top and bottom ends of the cell. Steel can 12 is formed to include curved side walls with rounded corners in which the four side walls are curved radially inward toward the central longitudinal axis of the cell 10. The electrochemical cell 10 may be formed with a deep draw can formation technique in which the inwardly curved side walls are either simultaneously formed to include the inward curvature during the deep draw process or a rectangular can is first formed in a deep draw can process and then hydroformed to reshape the rectangular can to form the inwardly curved side walls. The steel can 12 with inwardly curved side walls has a radial cross-sectional width extending between opposite walls at the midsection of each wall equal to width $W_1$ which is less than the radial cross-sectional width $W_2$ between the same opposite walls near the corners of steel can 12. It is preferred that each side wall of can 10 curves inward by an amount equal to at least the thickness of steel can 10 such that the outerwidth $W_2$ minus twice the thickness of steel can 10 is less than or equal to the inside width $W_1$. Accordingly, for a steel can having a thickness of 10 mils, the difference in width between widths $W_1$ and $W_2$ should be at least equal to 20 mils. The inwardly convex curved contour of the inside of side walls of steel can 12 advantageously provide for enhanced strength walls that oppose radial forces such as those caused by internal pressure within electrochemical cell 10, so as to reduce and/or prevent bulging of the cell walls.

The fully assembled electrochemical cell 10 is further shown in FIG. 4 from a top view in which the outer negative cover 26 of cover and seal assembly 14 is shown assembled on the top of can 12. According to the first embodiment, the electrochemical cell 10 has inwardly curved side walls extending throughout the entire length of the side walls of cell 10.

Referring to FIG. 5, there is shown an electrochemical cell 10' according to a second embodiment of the present invention. As shown, electrochemical cell 10' has a rectangular steel can 12' which is generally formed similar to steel can 12 of cell 10 of the first embodiment, except the second embodiment of cell 10' has side walls that vary in the amount of inward curvature that is provided along the length of steel can 12'. As is further shown in FIGS. 6 and 7, electrochemical cell 10' has the greatest amount of inward curvature in the side walls midway between the bottom end 16 and top end 18 of steel can 12'. At both the bottom end 16 and the top end 18, steel can 12 has a substantially rectangular radial cross section with little or no inward curvature as shown in FIG. 8. Accordingly, the amount of inward curvature in the side walls of steel can 12' increases toward the middle section along the length of cell 10' where the outward stress would be expected to be the greatest. Steel can 12' is preferably formed by first forming a rectangular can having planar side walls in a deep draw can formation process, and then subsequently reshaping the side walls to include the inward curvature with a hydroform formation process, according to one example.

Accordingly, the second embodiment of electrochemical cell 10' provides a greater amount of inward curvature at the middle portion of the can 12' to advantageously oppose radially outward forces due to expansion of the cell 10' that otherwise could have caused adverse affects on the cell 10'. The second embodiment of the present invention provides a compromise in that a greater overall volume of the cell 10' may be achieved, while at the same time providing a more limited, yet effective, amount of inward curvature where it is most needed to oppose radial outward forces from within the cell 10'. The radially inward curved surface of the present invention minimizes or prevents expansion of the side walls, while at the same time enhances the amount of surface area interfaced between the interior of steel can 12 and the cathode 20, which may advantageously reduce the electrical resistance therebetween and enhance service performance of the cell. It should also be appreciated that the cell 10 of the present invention may include a vent formed in the can wall or in the cover and seal assembly for releasing pressure from within the cell when the pressure buildup becomes excessive. The use of a vent is known in the art and may provide pressure relief in the cell to prevent excessive bulging of the side walls.

Figure 10:
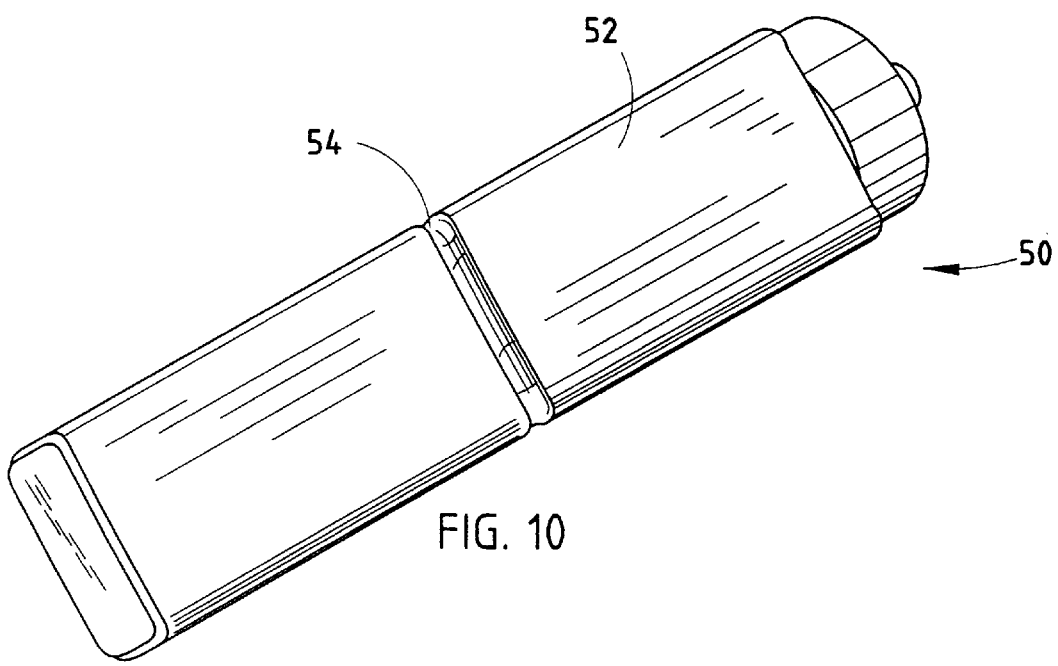
FIG. 10 is a perspective view of an electrochemical cell having a prismatic steel can with a groove formed around the perimeter according to a fourth embodiment.

Referring to FIGS. 9 and 10, additional embodiments of electrochemical cells 40 and 50 are illustrated therein for enhancing the surface area interface between the steel can and cathode, and for further enhancing strength of the side walls to oppose bulging of the can. With particular reference to FIG. 9, electrochemical cell 40 includes a prismatic rectangular steel can 42 having a plurality of inwardly curved indentations 44 configured as circular dimples, according to a third embodiment. The inwardly curved indentations 44 extend radially inward at least the thickness of the steel can and effectively enhance the amount of surface area interfacing between steel can 42 and the cathode, while at the same time enhancing strength of the can walls to prevent bulging thereof.

Referring to FIG. 10, an electrochemical cell 50 having a prismatic rectangular steel can 52 is shown having an inwardly curved U-shaped groove 54 formed around the perimeter according to a fourth embodiment. The U-shaped groove 54 extends radially inward by a distance equal to at least the thickness of the steel can 52 to enhance the surface area interface between the steel can 52 and the cathode, as well as to enhance the strength of the can walls to oppose bulging of the can 52. While the groove 54 is shown formed approximately midway between the top and bottom ends of can 52, it is preferred that groove 54 is formed at a location where the interior surface of can 52 contacts an electrode, such as the cathode. The groove 54 prevents or reduces can deformation in the radial direction.

While a certain number of inwardly curved indentations 44 and groove 54 are shown and described herein, it should be appreciated that any number of one or more indentations or grooves may employed in a can in connection with an electrochemical cell according to the present invention. It should also be appreciated that the inwardly curved indentations 44 and groove 54 could be employed with other shaped cans, including cylindrical cans, to increase can-to-cathode interface area, oppose can bulging and enable use of reduced can thickness without departing from the spirit of the present invention. The indentations and grooves could be preformed during can manufacture and may also be formed in a hydroform process.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An electrochemical cell comprising:
    a container having a closed bottom end, an open top end, and side walls, each having a plurality of substantially round dimples formed therein;
    a first electrode disposed in said container wherein said first electrode contacts an interior surface of said container including a surface of said plurality of substantially round dimples;
    a second electrode disposed in said container;
    a separator disposed between said first and second electrodes; and
    a cover and seal assembly assembled to said open top end of said container.

2. The electrochemical cell as defined in claim 1, wherein said first electrode comprises a cathode.

3. The electrochemical cell as defined in claim 1, wherein said container is conductive.

4. An electrochemical cell comprising:
    a non-cylindrical container having a closed bottom end, an open top end, and four side walls, wherein each of said side walls includes a plurality of substantially round dimples extending radially inward;
    a first electrode disposed in said container;
    a second electrode disposed in said container;
    a separator disposed between said first and second electrodes; and
    a cover and seal assembly assembled to said open top end of said container.

5. The electrochemical cell as defined in claim 4, wherein said first electrode is a cathode and has an outer perimeter which substantially conforms to the interior walls of said container and further has a cavity within which said second electrode is disposed.

6. The electrochemical cell as defined in claim 4, wherein said open top end of said container is round.

* * * * *